United States Patent
Jitsui et al.

(10) Patent No.: US 7,266,471 B2
(45) Date of Patent: Sep. 4, 2007

(54) SEAT OCCUPANT IDENTIFYING APPARATUS DESIGNED TO ESTABLISH HIGH ACCURACY OCCUPANT IDENTIFICATION

(75) Inventors: Akinori Jitsui, Okazaki (JP); Satoshi Goshima, Tokyo (JP)

(73) Assignees: DENSO CORPORATION, Kariya (JP); Fuji Jukogyo Kabushiki Kaisya, Tokyo (JP)

(*) Notice: Subject to any disclaimer, the term of this patent is extended or adjusted under 35 U.S.C. 154(b) by 375 days.

(21) Appl. No.: 10/800,719

(22) Filed: Mar. 16, 2004

(65) Prior Publication Data
US 2004/0183284 A1    Sep. 23, 2004

(30) Foreign Application Priority Data
Mar. 19, 2003    (JP)    ............................ 2003-075499

(51) Int. Cl.
B60R 21/00    (2006.01)
(52) U.S. Cl. ..................................... 702/155
(58) Field of Classification Search ................. 702/155
See application file for complete search history.

(56) References Cited
U.S. PATENT DOCUMENTS 6,356,200 B1   3/2002  Hamada et al.
6,363,429 B1   3/2002  Ketcham
6,563,429 B2   5/2003  Sakai et al.
6,774,804 B2 * 8/2004  Sakai et al. ................. 340/665

FOREIGN PATENT DOCUMENTS

| EP | 0990565   | 4/2000 |
| JP | 0990-565 A | 9/1998 |
| JP | 11-1153   | 1/1999 |

OTHER PUBLICATIONS

First Office Action issued from Japanese Patent Office issued on Oct. 11, 2005 for the corresponding Japanese patent applicatin No. 2003-075499 (a copy and English translation thereof).

* cited by examiner

Primary Examiner—John Barlow
Assistant Examiner—Cindy D. Khuu
(74) Attorney, Agent, or Firm—Posz Law Group, PLC

(57) ABSTRACT

A seat occupant identifying apparatus for automotive occupant restraint system is provided which works to identify whether a seat occupant is an adult passenger or a child passenger. When a total output value of a plurality of seat load sensors is greater than a given adult identifying threshold value, it is determined that the seat occupant is an adult. Afterwards, when the total output value decreases below the adult identifying threshold value due to, for example, a lateral G-force acting on the seat occupant during cornering of the vehicle, and an output of either of the right and left seat load sensors is lowered below a preselected cornering threshold value, while the other output is higher than it, the latest determination that the seat occupant is an adult is kept as it is. This provides for high accuracy seat occupant identification during cornering of the vehicle.

9 Claims, 7 Drawing Sheets

SEAT OCCUPANT IDENTIFYING APPARATUS DESIGNED TO ESTABLISH HIGH ACCURACY OCCUPANT IDENTIFICATION

BACKGROUND OF THE INVENTION

1. Technical Field of the Invention

The present invention relates generally to a seat occupant identifying apparatus designed to identify whether a seat occupant is an over-specified size passenger (e.g., an adult) or an under-specified size passenger (e.g., a child), and more particularly to a seat occupant identifying apparatus designed to achieve such identification correctly when a seat occupant physically leans, for example, during cornering, thus resulting in a shift in weight load on a seat.

2. Background Art

EP 0 990 565 A1 discloses an automotive airbag system designed to identify a vehicle occupant (i.e., an adult or a child) using all outputs of a plurality of sensors to control the amount of gas for deploying an airbag. A seat made up of a seat back and a seat cushion is mounted on a vehicle body member through a seat adjuster, rails, and rail mount brackets. The sensors are installed between the rails and the rail mount brackets.

When the seat is occupied by an adult, cornering of the vehicle may cause the total output W of the sensors to have a level lower than an adult identifying threshold value WTH. In order to avoid an instantaneous change in system decision about the identification of the occupant during the cornering, the system has a decision delay time TH (see FIG. 7).

Additionally, the cornering of the vehicle will cause a lateral G-force to act on the occupant, so that the body of the occupant is urged against a side door of the vehicle, which may result in an error in identifying the occupant. When a cornering duration becomes long, for example, during traveling on a mountain road or a ramp, it may result in an error in identifying the occupant after time t3, as illustrated in FIG. 7.

SUMMARY OF THE INVENTION

It is therefore a principal object of the invention to avoid the disadvantages of the prior art.

It is another object of the invention to provide a seat occupant identifying apparatus for vehicles which is designed to minimize an error in identifying whether a passenger on a seat of the vehicle is an adult or a child which may arise when the passenger has leaned to one side of the seat, for example, due to a lateral G-force during cornering.

According to one aspect of the invention, there is provided a seat occupant identifying apparatus which may be employed to activate an automotive occupant restraint system such as an airbag system. The seat occupant identifying apparatus comprises: (a) a right and a left sensor each of which is responsive to a change in preselected physical quantity acting on a seat of a vehicle which arises from occupancy of the seat by a passenger to provide an output indicative thereof, the right sensor being disposed on a right side of a bottom surface of the seat, the left sensor being disposed on a left side of the bottom surface of the seat; and (b) a seat occupant identifying circuit working to identify whether the passenger on the seat is a first sized occupant of more than a specified physical size or not. When a total sensor output that is the sum of the outputs of the right and left sensors is greater than a first seat occupant threshold value, the seat occupant identifying circuit determines the passenger on the seat as the first sized occupant. When the total sensor output decreases below the first seat occupant threshold value after the passenger is identified as the first sized occupant, and either one of the outputs of the right and left sensors is smaller than a second seat occupant threshold value smaller than the first seat occupant threshold value, the seat occupant identifying circuit keeps determination that the passenger is identified as the first sized occupant.

For example, the first sized occupant is an adult passenger, and the second sized occupant is a child passenger. When the vehicle has started to corner, the passenger on the seat experiences a lateral G-force and leans laterally during the cornering, thus resulting in a change in distribution of weight load of the passenger over the seat. This may cause an adult passenger on the seat to be identified in error as a child. In order to avoid this problem, the seat occupant identifying circuit works to keep the latest determination when the total sensor output decreases below the first seat occupant threshold value after the passenger on the seat is identified as an adult, and either one of the outputs of the right and left sensors is smaller than the second seat occupant threshold value smaller than the first seat occupant threshold value. This minimizes an error in determining that the occupant on the seat has changed from an adult to a child, for example, during cornering of the vehicle.

In the preferred mode of the invention, the seat occupant identifying circuit identifies the passenger on the seat as the first sized occupant when the total sensor output is kept greater than the first seat occupant threshold value for a preselected period of time.

The second seat occupant threshold value may be predetermined as indicating a minimum decrease in a weight load of the first sized occupant, as sensed by one of the right and left sensors, that is expected to arise when that the first sized occupant on the seat experiences a lateral G-force and leans laterally during cornering of the vehicle.

The seat occupant identifying apparatus may further comprise a second right sensor and a second left sensor which are disposed on the right side and the left side of the bottom surface of the seat, respectively. In this case, the total sensor output also includes outputs of the second right and left sensors. When either one of a right total output that is the sum of the outputs of the right sensors and a left total output that is the sum of the outputs of the left sensors is smaller than the second seat occupant threshold value, the seat occupant identifying circuit keeps the determination that the passenger is identified as the first sized occupant.

When the outputs of the right and left sensors both are kept greater than the second seat occupant threshold value for the preselected period of time following decrease in the total sensor output below the first seat occupant threshold value, the seat occupant identifying circuit may determine the passenger on the seat as a second sized occupant smaller in size than the first sized occupant.

According to the second aspect of the invention, there is provided a seat occupant identifying apparatus for a vehicle which comprise: (a) a right and a left sensor each of which is responsive to a change in preselected physical quantity acting on a seat of a vehicle which arises from occupancy of the seat by a passenger to provide an output indicative thereof, the right sensor being disposed on a right side of a bottom surface of the seat, the left sensor being disposed on a left side of the bottom surface of the seat; (b) a seat occupant identifying circuit working to identify whether the passenger on the seat is a first sized occupant of more than a specified physical size or not. When a total sensor output that is the sum of the outputs of the right and left sensors is greater than a first seat occupant threshold value, the seat occupant identifying circuit determines the passenger on the seat as the first sized occupant. When the total sensor output decreases below the first seat occupant threshold value after the passenger is identified as the first sized occupant, and an absolute value of a difference between the outputs of the right and left sensors is greater than a second seat occupant threshold value smaller than the first seat occupant threshold value, the seat occupant identifying circuit keeps such determination that the passenger is identified as the first sized occupant.

In the preferred mode of the invention, the seat occupant identifying circuit may identify the passenger on the seat as the first sized occupant when the total sensor output is kept greater than the first seat occupant threshold value for a preselected period of time.

The second seat occupant threshold value may be selected as indicating a minimum difference between portions of a weight load of the passenger acting on the right and left sides of the seat which is expected to arise when the first sized occupant on the seat experiences a lateral G-force and leans laterally during cornering of the vehicle.

The seat occupant identifying apparatus may further comprise a second right sensor and a second left sensor which are disposed on the right side and the left side of the bottom surface of the seat, respectively. In this case, the total sensor output also includes outputs of the second right and left sensors. When either one of a right total output that is the sum of the outputs of the right sensors and a left total output that is the sum of the outputs of the left sensors is smaller than the second seat occupant threshold value, the seat occupant identifying circuit may keep the determination that the passenger is identified as the first sized occupant.

When the absolute value of the difference between the outputs of the right and left sensors is kept greater than the second seat occupant threshold value for a preselected period of time following decrease in the total sensor output below the first seat occupant threshold value, the seat occupant identifying circuit may determine the passenger on the seat as a second sized occupant smaller in size than the first sized occupant.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
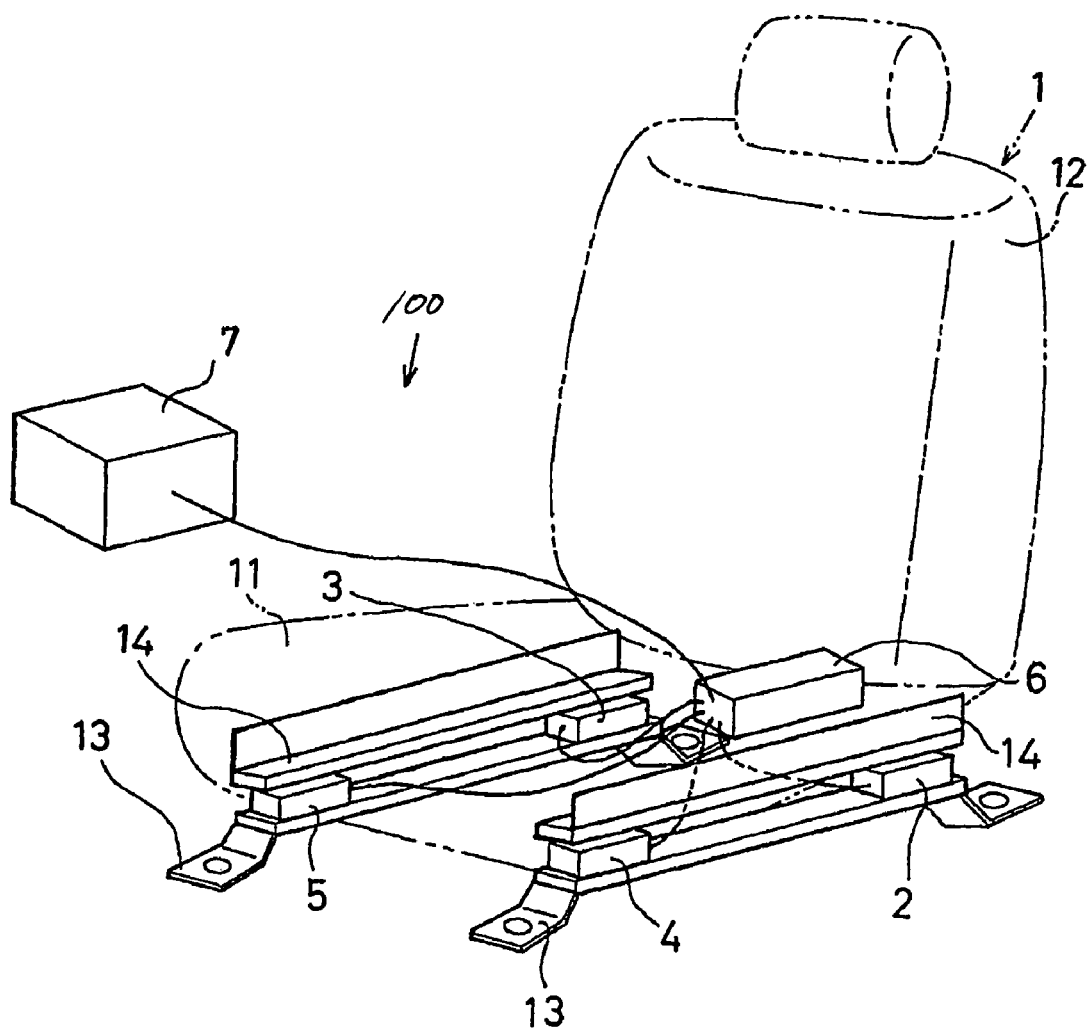
FIG. 1 is a perspective view which shows an occupant restraint system equipped with a seat occupant identifying apparatus according to the invention.
Figure 2:
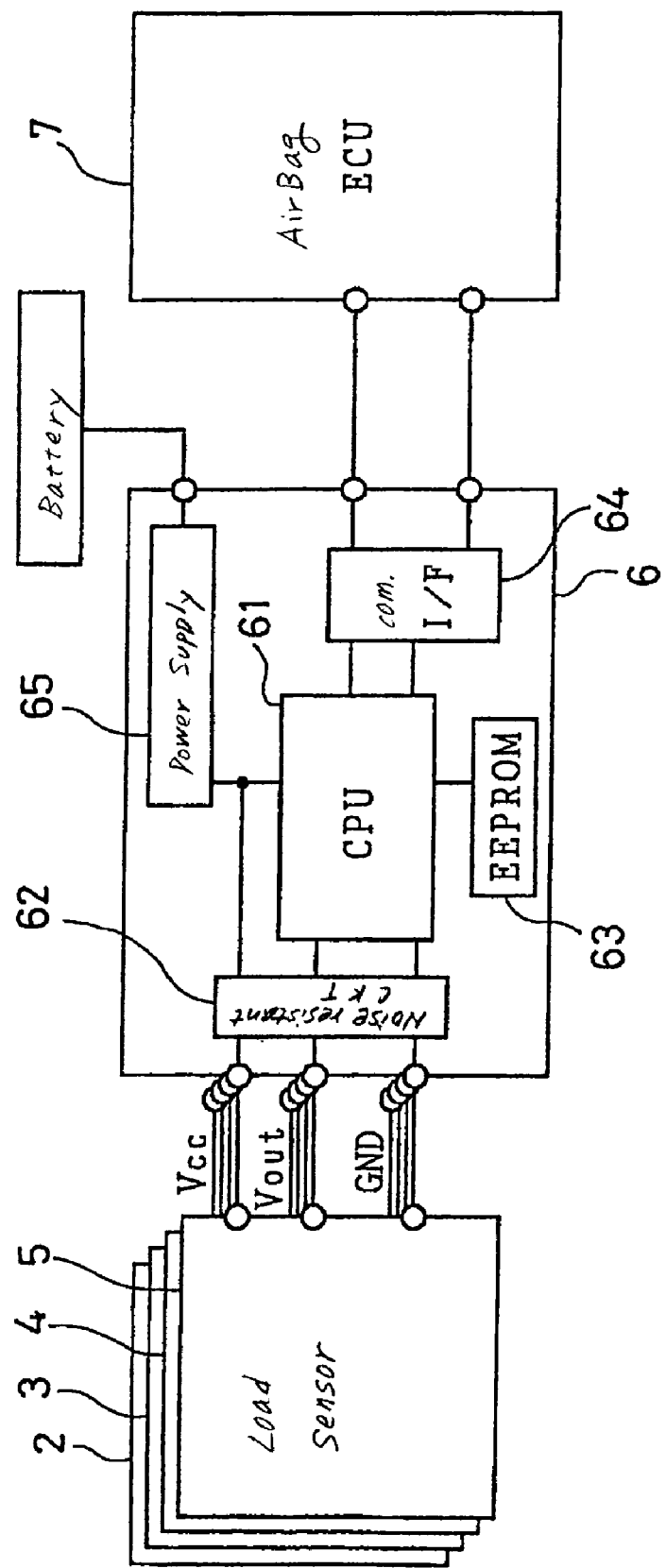
FIG. 2 is a block diagram which shows an occupant restraint system equipped with a seat occupant identifying apparatus of the invention.

Referring to the drawings, wherein like reference numbers refer to like parts in several views, particularly to FIGS. 1 and 2, there is shown an occupant restraint system 100 according to the first embodiment of the invention which may be employed in protecting an occupant of a motor vehicle during a crash.

The occupant restraint system 100 generally includes load sensors 2, 3, 4, and 5 installed beneath a passenger seat 1, a seat occupant identifying electronic control unit (ECU) 6, an airbag electronic control unit (ECU) 7, and an airbag (not shown). The seat occupant identifying ECU 6 works to identify whether a passenger or occupant on the seat 1 is a person of more than a preselected weight (i.e., an adult) or a person of less than the preselected weight (i.e., a child) using outputs of the load sensors 2 to 5. The airbag ECU 7 works to control deployment of the airbag in response to a trigger signal outputted from the seat occupant identifying ECU 6.

The seat 1, as illustrated, is a front passenger seat of a motor vehicle which is made of up a seat cushion 11 bearing the buttocks of the occupant and a seat back 12 supporting the back and head of the occupant.

The seat cushion 11 is secured at a bottom thereof to seat upper frames 14 extending longitudinally of a vehicle body in parallel to each other. The seat upper frames 14 are disposed above seat lower frames 13, respectively. The seat lower frames 13 are joined to a floor pan of the vehicle body.

The load sensor 2 is interposed between a rear end of the left seat lower frame 13 and a rear end of the left seat upper frame 14 and works to measure a weight load of the occupant applied to a rear left portion of the seat 1 and outputs a signal indicative thereof to the seat occupant identifying ECU 6.

The load sensor 3 is interposed between a rear end of the right seat lower frame 13 and a rear end of the right seat upper frame 14 and works to measure the weight load of the occupant applied to a rear right portion of the seat 1 and outputs a signal indicative thereof to the seat occupant identifying ECU 6.

The load sensor 4 is interposed between a front end of the left seat lower frame 13 and a front end of the left seat upper frame 14 and works to measure a weight load of the occupant applied to a front left portion of the seat 1 and outputs a signal indicative thereof to the seat occupant identifying ECU 6.

The load sensor 5 is interposed between a front end of the right seat lower frame 13 and a front end of the right seat upper frame 14 and works to measure the weight load of the occupant applied to a front right portion of the seat 1 and outputs a signal indicative thereof to the seat occupant identifying ECU 6.

Each of the load sensors 2 to 5 may be of any of known structures, and explanation thereof in detail will be omitted here.

The seat occupant identifying ECU 6, as clearly shown in FIG. 2, includes a CPU 61, a noise-resistant circuit 62, an EEPROM 63, an communications I/F 64, and a power supply circuit 65. The noise-resistant circuit 62 works to remove electrical disturbances or noises added to lines, as labeled "Vcc", "Vout", and "GND" in the drawing. The EEPROM 63 stores therein threshold values, as will be described later in detail. The I/F 64 connects between the CPU 61 and the airbag ECU 7 electrically to establish communication therebetween. The power supply circuit 65 is designed to convert the voltage developed by a storage battery installed in the vehicle into +5V. The seat occupant identifying ECU 6 is, as can be seen in FIG. 1, mounted on the floor panel of the vehicle body.

The seat occupant identifying ECU 6 works to determine the presence or the type of the occupant on the seat 1 (i.e., an adult or a child), detect the attitude or position of the occupant on the seat 1 immediately before a vehicle collision, and provides signals indicative thereof to the airbag ECU 7 through the I/F 64.

The airbag ECU 7 receives the signals transmitted from the seat occupant identifying ECU 6, i.e., information on the presence, the type, and the position of the occupant on the seat 1 and controls the deployment of the airbag installed within, for example, a dashboard of the vehicle.

The operation of the seat occupant identifying ECU 6 will be described below with reference to FIGS. 3 to 5.

Figure 3:
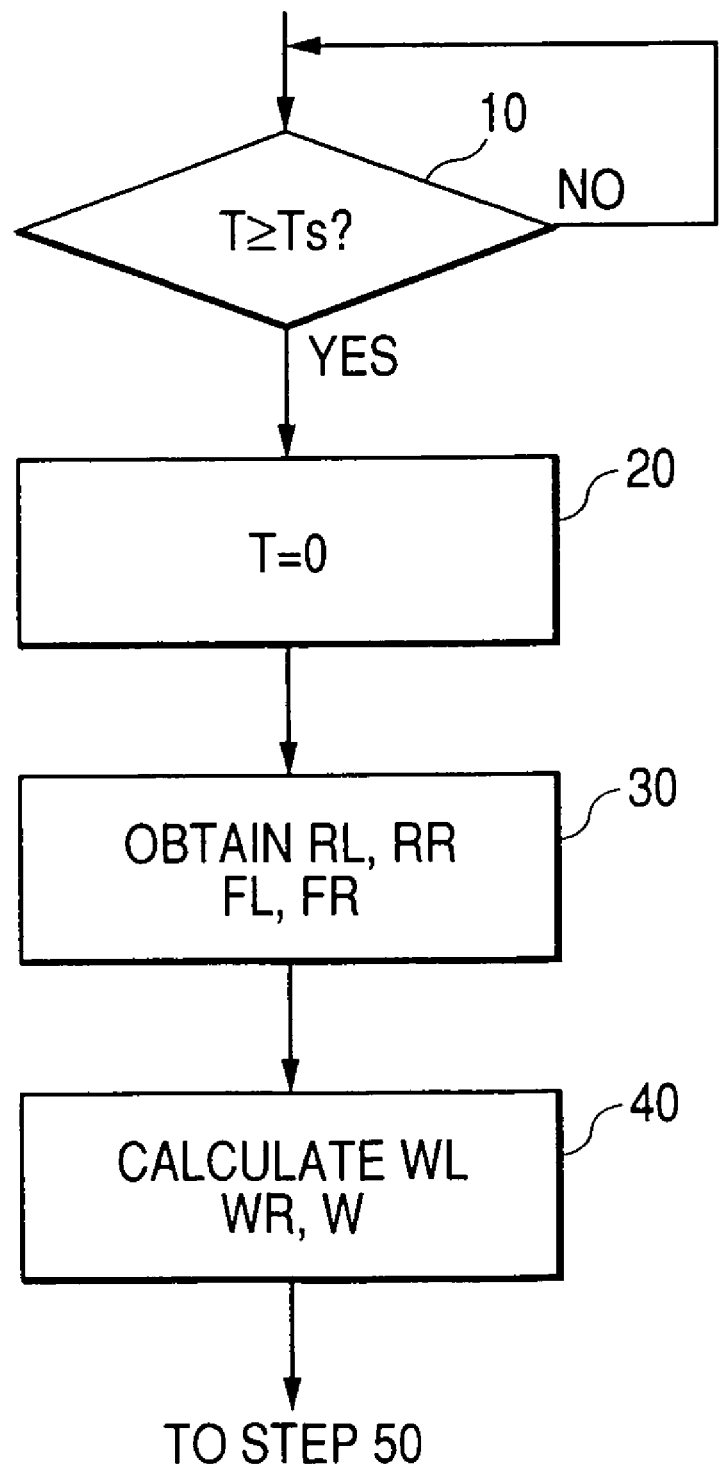
FIGS. 3 and 4 show a flowchart of a program executed by the seat occupant identifying apparatus, as illustrated in FIGS. 1 and 2, to identify the type of an occupant on a seat.
Figure 4:
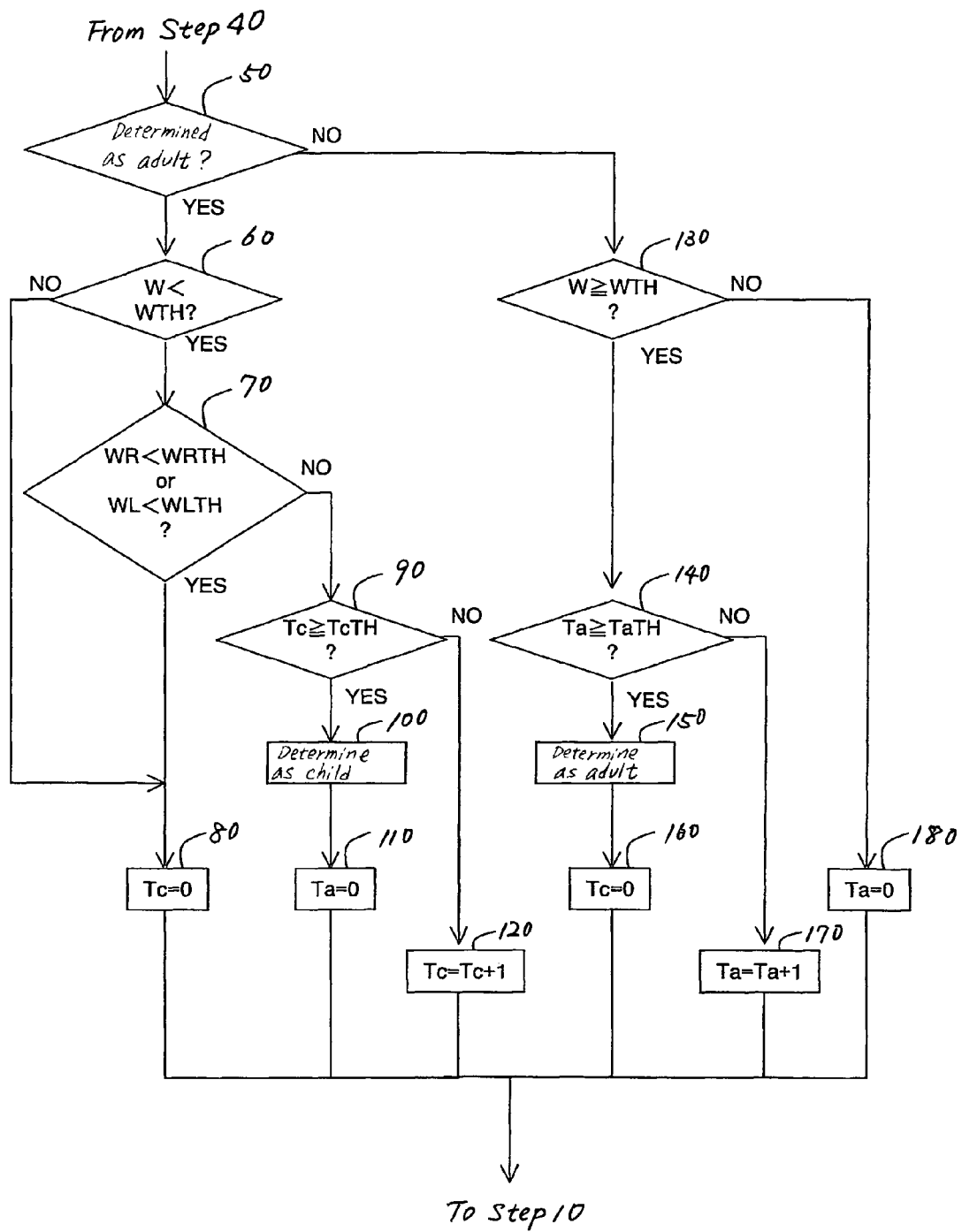

FIGS. 3 and 4 show a flowchart of logical steps or program executed by the ECU 6 to monitor the weight load of the occupant, as measured by the load sensors 2 to 5, to identify the type of an occupant on the seat 1 correctly.

After entering the program, the routine proceeds to step 10 wherein it is determined whether a count value T indicated by a seat occupant data sampling counter installed in the ECU 6 is greater than or equal to a preselected sampling time Ts or not. If a YES answer is obtained (T≧Ts), then the routine proceeds to step 20. Alternatively, if a NO answer is obtained, then the routine repeats step 1.

In step 20, the count value T of the seat occupant data sampling counter is reset to zero (0).

The routine proceeds to step 30 wherein the outputs of the load sensors 2 to 5 are monitored to determine a rear left load value RL, a rear right load value RR, a front left load value FL, and a front right load value FR.

The routine proceeds to step 40 wherein a left total load value WL, a right total load value WR, and a total load value W are determined as follows:

$$WL=RL+FL$$

$$WR=RR+FR$$

$$W=WL+WR$$

After step 40, the routine proceeds to steps, as illustrated in FIG. 4, to identify the type of the occupant on the seat 1.

First, in step 50, it is determined whether the occupant on the seat 1 has already been identified as an adult passenger one program cycle earlier or not. If a YES answer is obtained meaning that the seat occupant identifying ECU 6 is now identifying the occupant on the seat 1 as an adult, then the routine proceeds to step 60 wherein it is determined whether the total load value W is smaller than an adult identifying threshold value WTH or not.

Note that the adult identifying threshold value WTH is preselected to a value of, for example, 35 kg derived by subtracting 5 kg from 40 kg which is expected as the sum of outputs of all the load sensors 2 to 5 when, for example, a smaller size adult of 50 kg is sitting on the seat 1 with his or her legs resting on the floor of the vehicle and set greater than a seat unoccupancy threshold value WeTH (WTH≧WeTH). The seat unoccupancy threshold value WeTH is a weight load on the seat 1 used to determine that the seat 1 is unoccupied by the passenger of the vehicle.

Note that a count value Tc of a counter used to measure a child identifying time limit, as will be described below, and a count value Ta of a counter used to measure an adult identifying time limit, as will be described below, are each initially set to zero (0).

If a YES answer is obtained (W<WTH) in step 60, then the routine proceeds to step 70 wherein it is determined whether the right total load value WR is smaller than a cornering threshold value WRTH or not and whether the left total load value WL is smaller than a cornering threshold value WLTH or not. If a YES answer is obtained meaning that the right total load value WR is smaller than the cornering threshold value WRTH, but the left total load value WL is greater than or equal to the cornering threshold value WLTH or that the left total load value WL is smaller than the cornering threshold value WLTH, but the right total load value WR is greater than or equal to the cornering threshold value WRTH, then the routine returns back to step 80 wherein the child identifying time limit counter value Tc is reset to zero (0). The cornering threshold value WRTH is predetermined to the sum of outputs of the left load sensors 2 and 4 produced when a portion of the weight load of, for example, a smaller adult passenger of 50 kg acting on the left side of the seat 1 has a value (e.g., 0 kg) preselected within a range of zero (0)±given loads (e.g., ±5 kg), which is expected to arise when the adult passenger experiences a rightward G-force and leans rightward on the seat 1 during cornering of the vehicle in the leftward direction. The cornering threshold value WLTH is predetermined in a similar manner. The cornering threshold values WRTH and WLTH may be identical with or different from each other.

Alternatively, if a NO answer is obtained in step 70, then the routine proceeds to step 90 wherein it is determined whether the child identifying time limit count value Tc has reached a preselected time limit TcTH or not. If a NO answer is obtained, then the routine proceeds to step 120 wherein the child identifying time limit count value Tc is incremented by one (1) and returns back to step 10 of FIG. 3. Alternatively, if a YES answer is obtained (Tc≧TcTH), then the routine proceeds to step 100 wherein the occupant on the seat 1 is identified as a child passenger. The routine proceeds to step 110 wherein the adult identifying time limit count value Ta is reset to zero (0) and returns back to step 10 of FIG. 3.

If a NO answer is obtained in step 50 meaning that the seat occupant identifying ECU 6 is not now identifying the occupant on the seat 1 as an adult, then the routine proceeds to step 130 wherein it is determined whether the total load value W is greater than or equal to the adult identifying threshold value WTH or not. If a NO answer is obtained, then the routine proceeds to step 180 wherein the adult identifying time limit count value Ta is reset to zero (0) and returns back to step 10 of FIG. 3.

Alternatively, if a YES answer is obtained in step 130 (W≧WTH), then the routine proceeds to step 140 wherein it is determined whether the adult identifying time limit count value Ta has reached a preselected time limit TaTH or not. If a NO answer is obtained (Ta<TaTH), then the routine proceeds to step 170 wherein the adult identifying time limit count value Ta is incremented by one (1) and returns back to step 10 of FIG. 3. Alternatively, if a YES answer is obtained (Ta≧TaTH), then the routine proceeds to step 150 wherein the occupant on the seat 1 is identified as an adult passenger. The routine proceeds to step 160 wherein the child identifying time limit counter value Tc is reset to zero (0) and returns back to step 10 of FIG. 3.

As apparent from the above discussion, when at the expiry of the time limit TaTH since the total load value W exceeds the adult identifying threshold value WTH, the total load value W is still kept greater than the adult identifying threshold value WTH, the seat occupant identifying ECU 6 determines that the occupant on the seat 1 is an adult. Afterwards, when the total load value W decreases below the adult identifying threshold value WTH, but either of two conditions where the right total load value WR is smaller than the cornering threshold value WRTH, but the left total load value WL is greater than or equal to the cornering threshold value WLTH and where the left total load value WL is smaller than the cornering threshold value WLTH, but the right total load value WR is greater than or equal to the cornering threshold value WRTH is met, the seat occupant identifying ECU 6 maintains the last determination that the occupant on the seat 1 is an adult.

An example of the above case will be discussed below with reference to FIG. 5.

When the vehicle starts to turn left at a time T1 after the seat occupant identifying ECU 6 determines the occupant on the seat 1 to be an adult, it will cause the occupant on the seat 1 to experience a lateral G-force, so that the occupant leans against a right door of the vehicle, thereby resulting in a great decrease in the left total load value WL (i.e., the value of weight load of the occupant acting on an outside portion of the seat 1 during the turn) and a great increase in the right total load value WR during the turn (i.e., between times T1 and T5). This causes the left total load value WL to be determined by the seat occupant identifying ECU 6 as being lower than the cornering threshold value WLTH. This determination is kept as it is within the time limit TaTH (i.e. between times T6 and T7). Specifically, the seat occupant identifying ECU 6 continues to determine the occupant on the seat 1 to be an adult even when the total load value W decreases below the adult identifying threshold value WTH due to the lateral G-force acting on the occupant on the seat 1. This prevents the occupant on the seat 1 from being determined in error as having changed from an adult to a child during the turn, thus enabling the airbag ECU 7 to deploy the airbag correctly upon a vehicle collision.

When the vehicle turns right, it causes the occupant on the seat 1 to lean against, for example, a console box. In this case, a lateral shift in the weight load of the occupant is different from that when the vehicle turns left. It is, thus, advisable that the left cornering threshold value WRTH be selected to be different from the right cornering threshold value WLTH.

Upon completion of the turn, the lateral G-force disappears, and the right and left total load values WR and WL are balanced with each other, so that a condition where the right and left total load values WR and WL are greater than the cornering threshold values WRTH and WLTH is encountered. The seat occupant identifying ECU 6 continues to determine the occupant on the seat 1 to be an adult.

When the occupant on the seat 1 has changed from an adult to a child, the total load value W usually decreases below the adult identifying threshold value WTH. When this condition is kept over the time limit TcTH, the seat occupant identifying ECU 6 determines that the seat 1 is occupied by a child. Specifically, when the occupant on the seat 1 has changed from an adult to a child, the operations in steps 90 to 120 in FIG. 4 provide for a correct occupant identification, thus enabling the airbag ECU 7 to establish the degree of deployment of the airbag suitable for the child.

Figure 6:
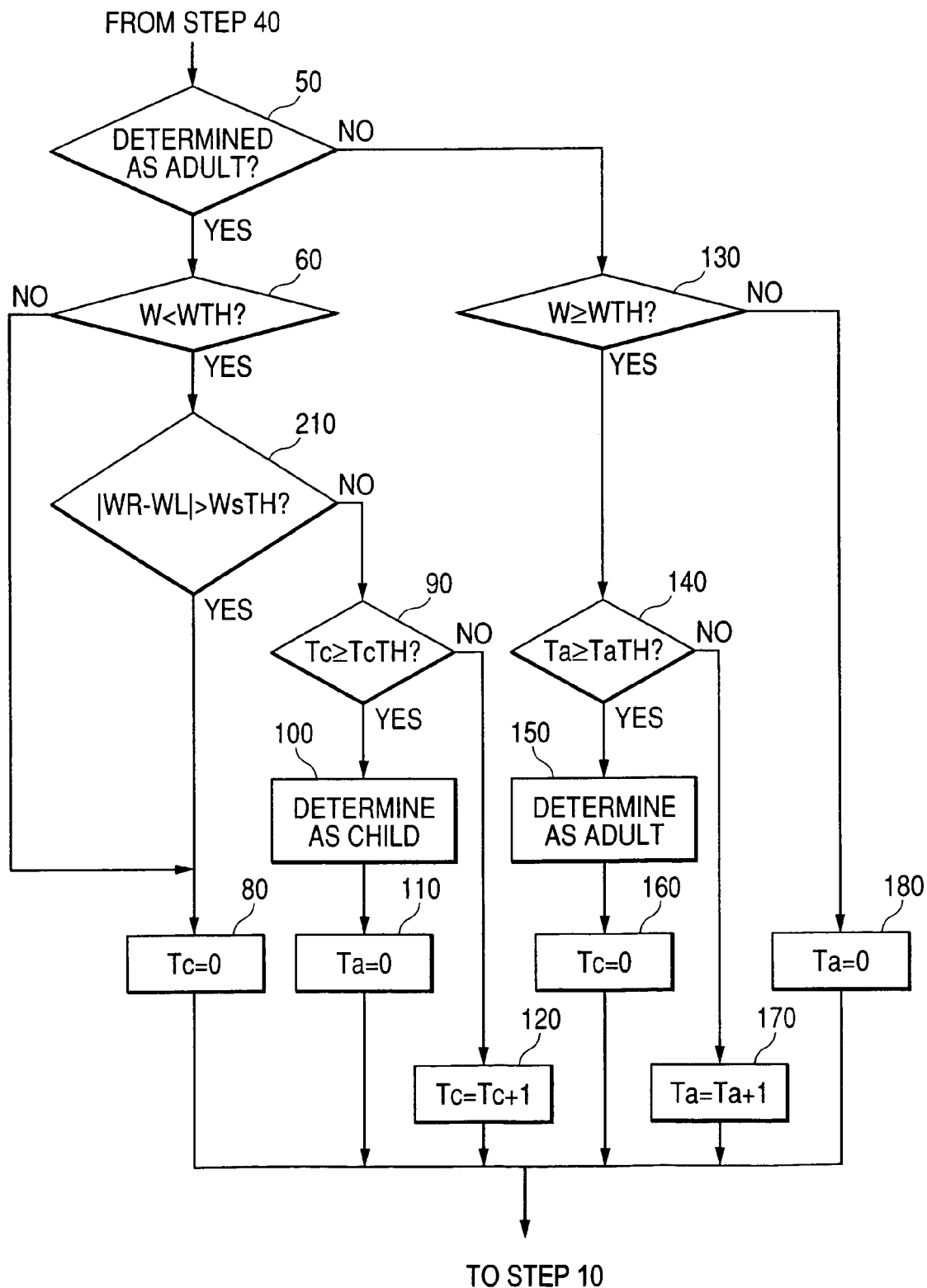
FIG. 6 shows a flowchart of a modification of the program, as illustrated in FIG. 4.
Figure 7:
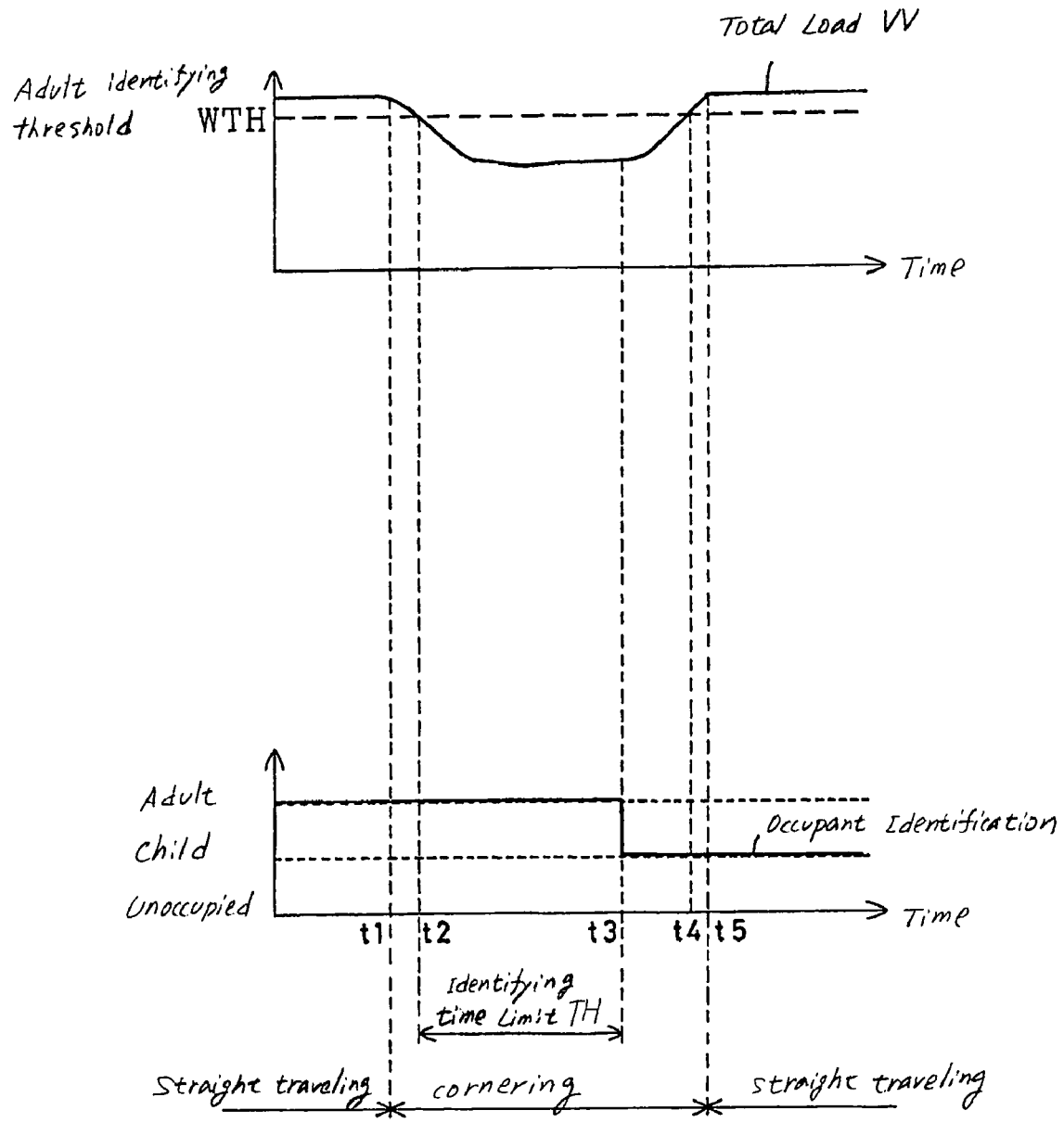
FIG. 7 is a time chart which shows an example of an operation of a conventional seat occupant identifying system.

FIG. 6 shows a flowchart of a modification of the program of FIG. 4 to be executed by the seat occupant identifying ECU 6.

The program in FIG. 6 is different from the one shown in FIG. 4 only in step 210. Other steps are identical, and explanation thereof in detail will be omitted here.

After step 60, the routine proceeds to step 210 wherein it is determined whether an absolute value of a difference between the right total load value WR and the left total load value WL is greater than a preselected cornering threshold value WsTH or not. If a YES answer is obtained (|WR−WL|>WsTH), then the routine proceeds to step 80 to reset the child identifying time limit counter value Tc to zero (0). Alternatively, if a NO answer is obtained, then the routine proceeds to step 80. Note that the cornering threshold value WsTH is predetermined to an absolute value of a minimum possible difference between portions of a weight load of an occupant on the seat 1 acting on the right and left sides of the seat 1, which is usually expected to arise when an adult passenger on the seat 1 experiences a lateral G-force and leans laterally during cornering of the vehicle. For instance, when a smaller size adult passenger of 50 kg is sitting on the seat 1 with his or her legs resting on the floor of the vehicle, the total load value W shows 40 kg. When the passenger on the seat 1 experiences a lateral G-force and leans against the door of the vehicle during cornering of the vehicle, it may cause one of the right total load value WR and the left total load value WL, as derived by the right load sensors 3 and 5 or the left load sensors 2 and 4 which are located outside during the cornering, to have 30 kg and the other to have 0 kg. In this case, the cornering threshold value WsTH is set to 30 kg (=|0 kg−30 kg|).

In operation, when at the expiry of the time limit TaTH since the total load value W exceeds the adult identifying threshold value WTH, the total load value W is still kept greater than the adult identifying threshold value WTH, the seat occupant identifying ECU 6 determines that the occupant on the seat 1 is an adult. Afterwards, when the total load value W decreases below the adult identifying threshold value WTH, but the absolute value of a difference between the right total load value WR and the left total load value WL is kept greater than a preselected cornering threshold value WsTH, the seat occupant identifying ECU 6 maintains the latest determination that the occupant on the seat 1 is an adult.

Figure 5:
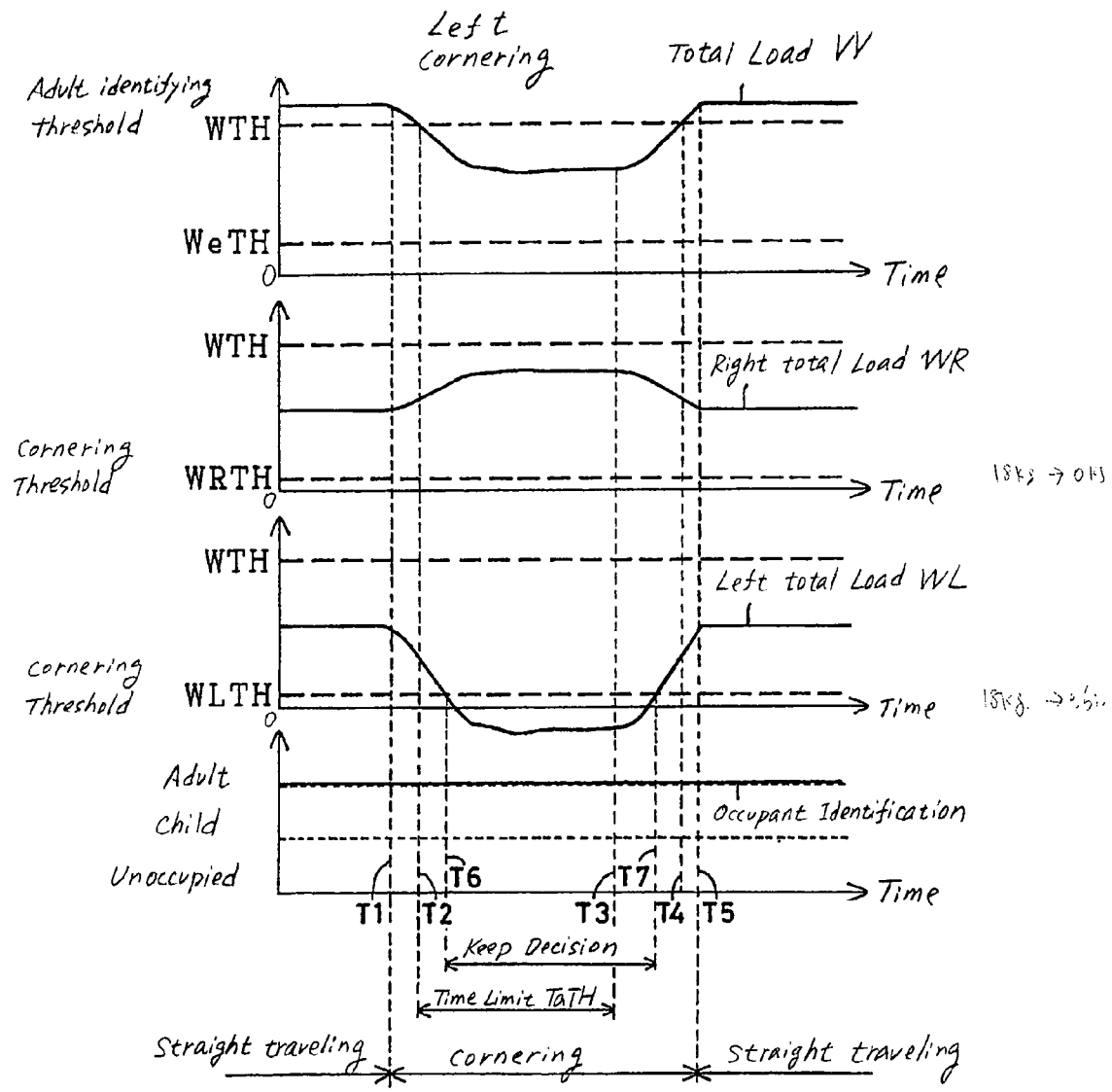
FIG. 5 is a time chart which shows an example of an operation of the seat occupant identifying apparatus as illustrated in FIGS. 1 and 2.

For instance, when the vehicle starts to turn left at a time T1, as shown in FIG. 5, after the seat occupant identifying ECU 6 determines the occupant on the seat 1 to be an adult, it will cause the occupant on the seat 1 to experience a lateral G-force, so that the occupant leans against a right door of the vehicle, thereby resulting in a great decrease in the left total load value WL (i.e., the value of weight load of the occupant acting on an outside portion of the seat 1 during the turn) and a great increase in the right total load value WR during the turn (i.e., between times T1 and T5). This causes the left total load value WL to be determined as being lower than the cornering threshold value WLTH. This determination is kept as it is within the time limit TaTH (i.e., between times T6 and T7). Specifically, the seat occupant identifying ECU 6 continues to determine the occupant on the seat 1 to be an adult as long as the total load value W decreases below the adult identifying threshold value WTH due to the lateral G-force acting on the occupant on the seat 1, but the condition of |WR−WL|>WsTH is met. This prevents the occupant on the seat 1 from being determined in error as having changed from an adult to a child during the turn, thus enabling the airbag ECU 7 to deploy the airbag correctly upon a vehicle collision.

Upon completion of the turn, the lateral G-force disappears, the right and left total load values WR and WL are balanced with each other, so that a condition of |WR−WL|≦WsTH is encountered (i.e., NO in step 210), but the seat occupant identifying ECU 6 continues to determine the occupant on the seat 1 to be an adult as long as the seat 1 is occupied by an adult passenger.

When the occupant on the seat 1 has changed from an adult to a child, the total load value W decreases below the adult identifying threshold value WTH. When this condition is kept over the time limit TcTH, the seat occupant identifying ECU 6 determines that the seat 1 is occupied by a child. Specifically, when the occupant on the seat 1 has changed from an adult to a child, the operations in steps 90 to 120 in FIG. 4 provide for a correct occupant identification, thus enabling the airbag ECU 7 to establish the degree of deployment of the airbag suitable for the child.

Each of the load sensors 2 to 5 is implemented by a strain gauge sensor, but may alternatively be of any other known type responsive to deformation or a vertical movement of the seat cushion 11 arising from the weight load of the occupant.

One of the right load sensors 3 and 5 and one of the left load sensors 2 and 4 may be omitted. Specifically, at least one load sensor may be provided on each side of the seat cushion 11 In this case, an output of one of the lead sensors installed on the right side of the seat cushion 11 is determined as the right total load value WR, and an output of the other load sensor is determined as the left total load value WL in step 40 of FIG. 3. The cornering threshold values WRTH and WLTH each may be predetermined as indicating a temporal minimum decrease in a portion of a weight load of an adult passenger acting on one side of the seat cushion 11 that is expected to arise when the adult passenger changes his or her position on the seat 1 for some reason during straight traveling of the vehicle, thus resulting in a change in distribution of the weight load over the seat cushion 11.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A seat occupant identifying apparatus for a vehicle comprising:
    a right and a left sensor each of which is responsive to a change in preselected physical quantity acting on a seat of a vehicle which arises from occupancy of the seat by a passenger to provide an output indicative thereof, the right sensor being disposed on a right side of a bottom surface of the seat, the left sensor being disposed on a left side of the bottom surface of the seat; and
    a seat occupant identifying circuit working to identify whether the passenger on the seat is a first sized occupant of more than a specified physical size or not, when a total sensor output that is the sum of the outputs of said right and left sensors is greater than a first seat occupant threshold value, said seat occupant identifying circuit determining the passenger on the seat as the first sized occupant, when the total sensor output decreases below the first seat occupant threshold value after the passenger is identified as the first sized occupant, and only either one of the outputs of said right and left sensors is smaller than a second seat occupant threshold value, the second seat occupant threshold value being smaller than the first seat occupant threshold value, said seat occupant identifying circuit keeping determination that the passenger is identified as the first sized occupant,
    wherein the second seat occupant threshold value further includes a left second seat occupant threshold value corresponding to the left sensor, and a right second seat occupant threshold value corresponding to the right sensor, and wherein the left second seat occupant threshold value is different from the right second seat occupant threshold value to reflect an expected different lateral shift by the passenger.

2. A seat occupant identifying apparatus as set forth in claim 1, wherein said seat occupant identifying circuit identifies the passenger on the seat as the first sized occupant when the total sensor output is kept greater than the first seat occupant threshold value for a preselected period of time.

3. A seat occupant identifying apparatus as set forth in claim 1, further comprising a second right sensor and a second left sensor which are disposed on the right side and the left side of the bottom surface of the seat, respectively, and wherein the total sensor output also includes outputs of the second right and left sensors, when either one of a right total output that is the sum of the outputs of said right sensors and a left total output that is the sum of the outputs of the left sensors is smaller than the second seat occupant threshold value, said seat occupant identifying circuit keeping the determination that the passenger is identified as the first sized occupant.

4. A seat occupant identifying apparatus as set forth in claim 1, wherein when the outputs of said right and left sensors both are kept greater than the second seat occupant threshold value for a preselected period of time following decrease in the total sensor output below the first seat occupant threshold value, said seat occupant identifying circuit determines the passenger on the seat as a second sized occupant smaller in size than the first sized occupant.

5. A seat occupant identifying apparatus for a vehicle comprising:
    a right and a left sensor each of which is responsive to a change in preselected physical quantity acting on a seat of a vehicle which arises from occupancy of the seat by a passenger to provide an output indicative thereof, the right sensor being disposed on a right side of a bottom surface of the seat, the left sensor being disposed on a left side of the bottom surface of the seat; and
    a seat occupant identifying circuit working to identify whether the passenger on the seat is a first sized occupant of more than a specified physical size or not, when a total sensor output that is the sum of the outputs of said right and left sensors is greater than a first seat occupant threshold value, said seat occupant identifying circuit determining the passenger on the seat as the first sized occupant, when the total sensor output decreases below the first scat occupant threshold value after the passenger is identified as the first sized occupant, and an absolute value of a difference between the outputs of said right and left sensors is greater than a second seat occupant threshold value smaller than the first seat occupant threshold value, said seat occupant identifying circuit keeping determination that the passenger is identified as the first sized occupant, wherein the second seat occupant threshold value further includes a left second seat occupant threshold value corresponding to the left sensor, and a right second seat occupant threshold value corresponding to the right sensor, and wherein the left second seat occupant threshold value is different from the right second seat occupant threshold value to reflect an expected different lateral shift by the passenger.

6. A seat occupant identifying apparatus as set forth in claim 5, wherein said seat occupant identifying circuit identifies the passenger on the seat as the first sized occupant when the total sensor output is kept greater than the first seat occupant threshold value for a preselected period of time.

7. A seat occupant identifying apparatus as set forth in claim 5, wherein the second seat occupant threshold value is predetermined to an absolute of a minimum possible difference between portions of a weight load of the passenger acting on the right and left sides of the seat which is expected to arise when the first sized occupant on the seat experiences a lateral G-force and leans laterally during cornering of the vehicle.

8. A seat occupant identifying apparatus as set forth in claim 5, further comprising a second right sensor and a second left sensor which are disposed on the right side and the left side of the bottom surface of the seat, respectively, and wherein the total sensor output also includes outputs of the second right and left sensors, when either one of a right total output that is the sum of the outputs of said right sensors and a left total output that is the sum of the outputs of the left sensors is smaller than the second seat occupant threshold value, said seat occupant identifying circuit keeping the determination that the passenger is identified as the first sized occupant.

9. A seat occupant identifying apparatus as set forth in claim 5, wherein when the absolute value of the difference between the outputs of said right and left sensors is kept greater than the second seat occupant threshold value for a preselected period of time following decrease in the total sensor output below the first seat occupant threshold value, said seat occupant identifying circuit determines the passenger on the seat as a second sized occupant smaller in size than the first sized occupant.

* * * * *